United States Patent
Matsunaga et al.

(10) Patent No.: US 10,033,232 B2
(45) Date of Patent: Jul. 24, 2018

(54) LAMINATE AND METHOD FOR MANUFACTURING THE SAME AND METHOD FOR MANUFACTURING LAMINATED CORE

(71) Applicants: Mitsui High-tec, Inc., Kitakyushu, Fukuoka (JP); HONDA MOTOR CO., LTD., Tokyo (JP)

(72) Inventors: Yukio Matsunaga, Kitakyushu (JP); Hisatomo Ishimatsu, Kitakyushu (JP); Yusuke Hasuo, Kitakyushu (JP); Masahiro Izumi, Kitakyushu (JP); Manabu Yazaki, Wako (JP)

(73) Assignees: Honda Motor Co., Ltd., Tokyo (JP); Mitsui High-tec, Inc., Kitakyushu-shi (JP)

( * ) Notice: Subject to any disclaimer, the term of this patent is extended or adjusted under 35 U.S.C. 154(b) by 336 days.

(21) Appl. No.: 14/961,741

(22) Filed: Dec. 7, 2015

(65) Prior Publication Data

US 2016/0164350 A1 Jun. 9, 2016

(30) Foreign Application Priority Data

Dec. 9, 2014 (JP) .................. 2014-248812

(51) Int. Cl.
*H01F 3/00* (2006.01)
*H02K 1/14* (2006.01)
*B32B 15/01* (2006.01)
*B32B 15/04* (2006.01)
(Continued)

(52) U.S. Cl.
CPC .............. *H02K 1/148* (2013.01); *B32B 7/12* (2013.01); *B32B 15/01* (2013.01); *B32B 15/043* (2013.01);
(Continued)

(58) Field of Classification Search
CPC ......... B32B 7/12; B32B 15/01; B32B 15/043; B32B 37/12; H02K 1/148
(Continued)

(56) References Cited

U.S. PATENT DOCUMENTS 3,313,967 A * 4/1967 Ross ...................... H02K 1/185
310/216.129
2004/0064936 A1* 4/2004 Neuenschwander .. H02K 1/148
29/609
(Continued)

FOREIGN PATENT DOCUMENTS

JP H10-127015 A 5/1998
JP 2007-336608 A 12/2007
(Continued)

*Primary Examiner* — Thanh Lam
(74) *Attorney, Agent, or Firm* — Procopio, Cory, Hargreaves and Savitch LLP

(57) ABSTRACT

This disclosure relates to a method for manufacturing a laminate used for manufacturing a laminated core including a circumferential yoke part and a plurality of magnetic pole parts radially extending from the yoke part. This method includes: feeding a metal sheet drawn from a roll thereof to a progressive die; stamping out a plurality of workpieces from the metal sheet in the progressive die, wherein each of the workpiece comprises a temporarily-interlocking portion between adjacent magnetic pole portions; and stacking the workpieces to integrate these workpieces together by the temporarily-interlocking portion to obtain the laminate.

18 Claims, 16 Drawing Sheets

(51) Int. Cl.
    *B32B 7/12*     (2006.01)
    *H02K 15/02*     (2006.01)
    *B32B 37/12*     (2006.01)

(52) U.S. Cl.
    CPC ............ *H02K 15/022* (2013.01); *B32B 37/12* (2013.01); *B32B 2255/06* (2013.01); *B32B 2307/208* (2013.01); *B32B 2457/00* (2013.01); *H02K 2201/09* (2013.01)

(58) Field of Classification Search
    USPC .................................................. 29/596–598
    See application file for complete search history.

(56) References Cited

U.S. PATENT DOCUMENTS

| | | | | |
|---|---|---|---|---|
| 2004/0083600 | A1* | 5/2004 | Neuenschwander | H01F 3/02 29/609 |
| 2009/0026873 | A1* | 1/2009 | Matsuo | H02K 1/148 310/216.009 |
| 2009/0146519 | A1* | 6/2009 | Myojin | H02K 1/276 310/156.53 |
| 2012/0043848 | A1* | 2/2012 | Neuenschwander | H02K 1/148 310/216.043 |
| 2012/0104894 | A1* | 5/2012 | Van Den Bossche | H02K 1/14 310/216.011 |
| 2014/0109391 | A1* | 4/2014 | Matsubayashi | H02K 15/0025 29/596 |

FOREIGN PATENT DOCUMENTS

| | | |
|---|---|---|
| JP | 2011239591 A | 11/2011 |
| JP | 5357187 B2 | 12/2013 |
| JP | 2014-176891 A | 9/2014 |
| WO | 2010082465 A1 | 7/2010 |

* cited by examiner

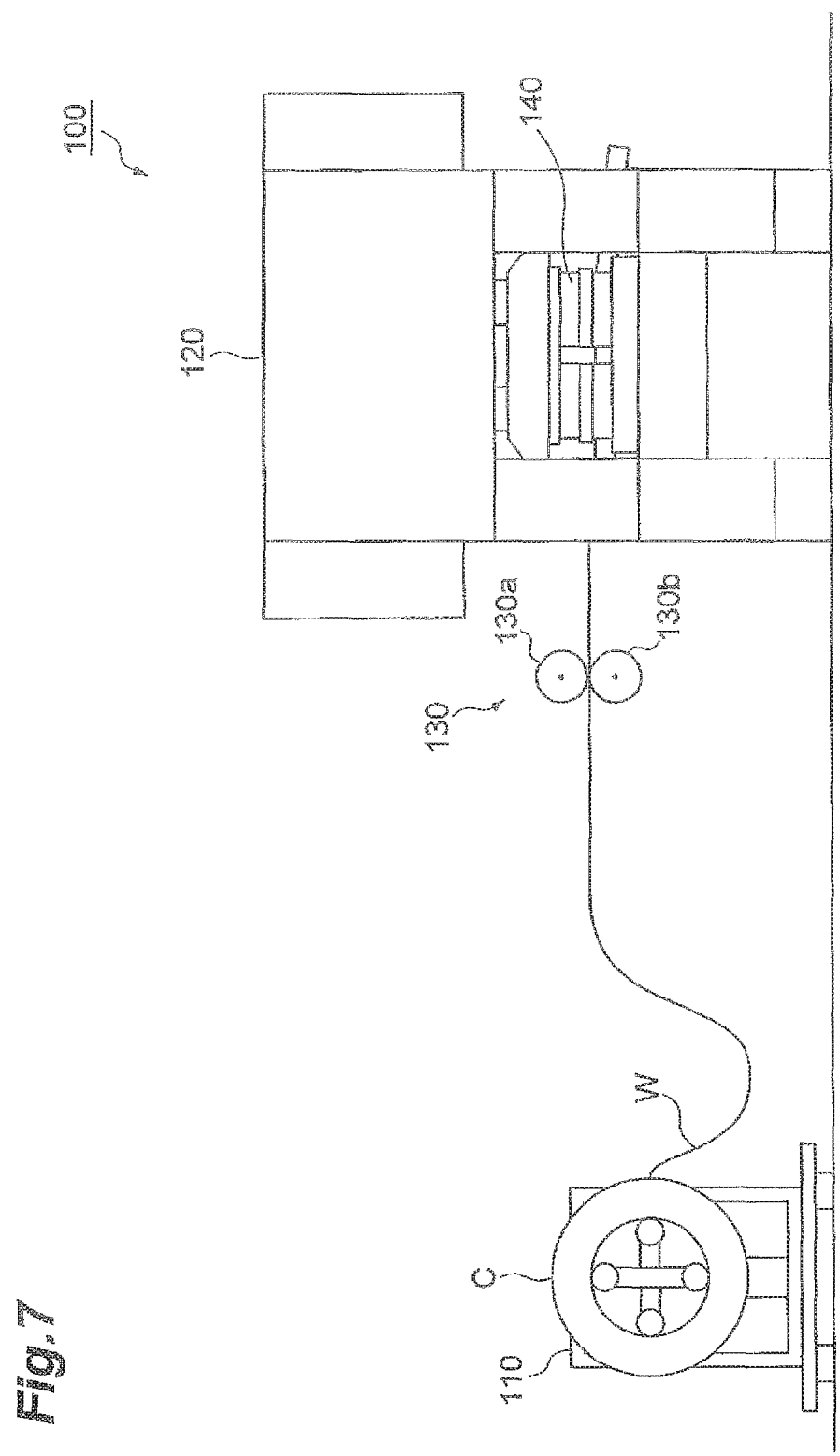

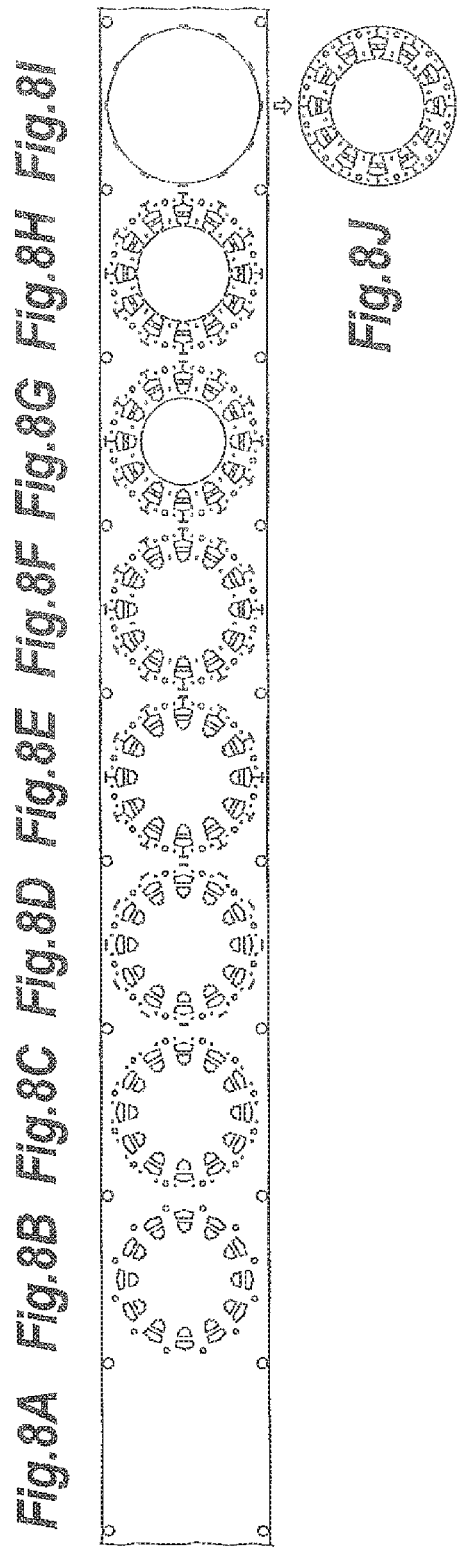

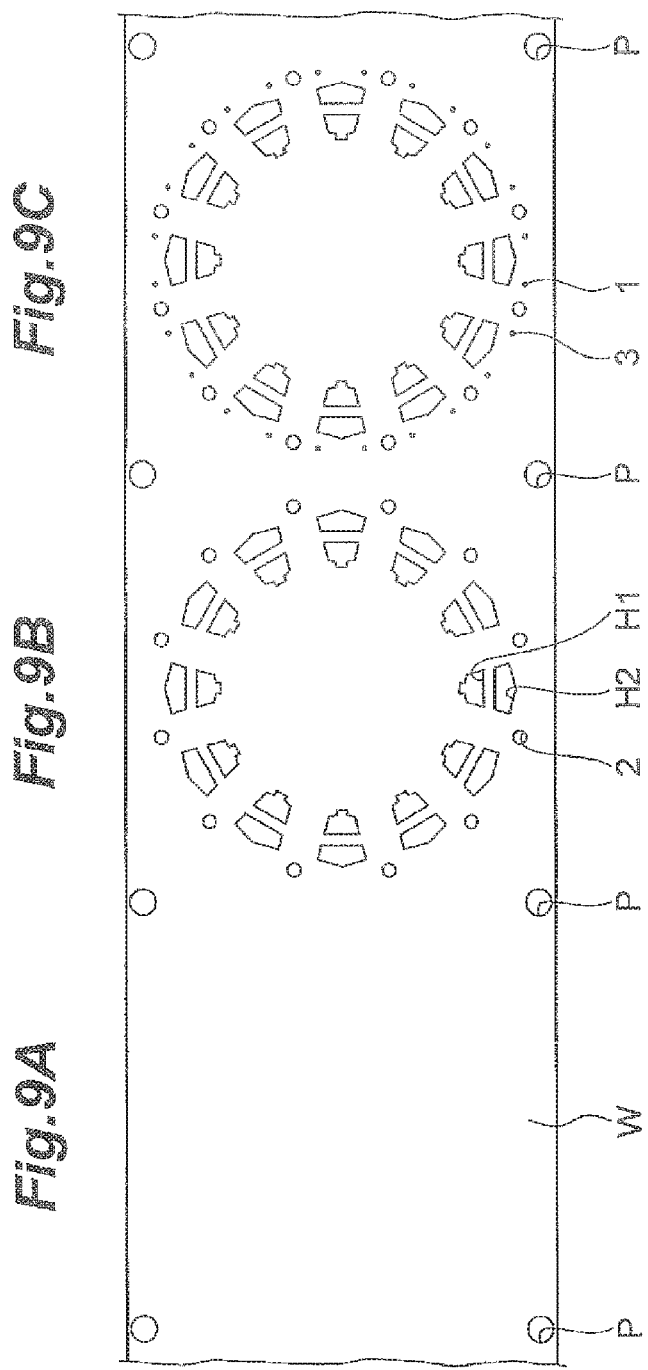

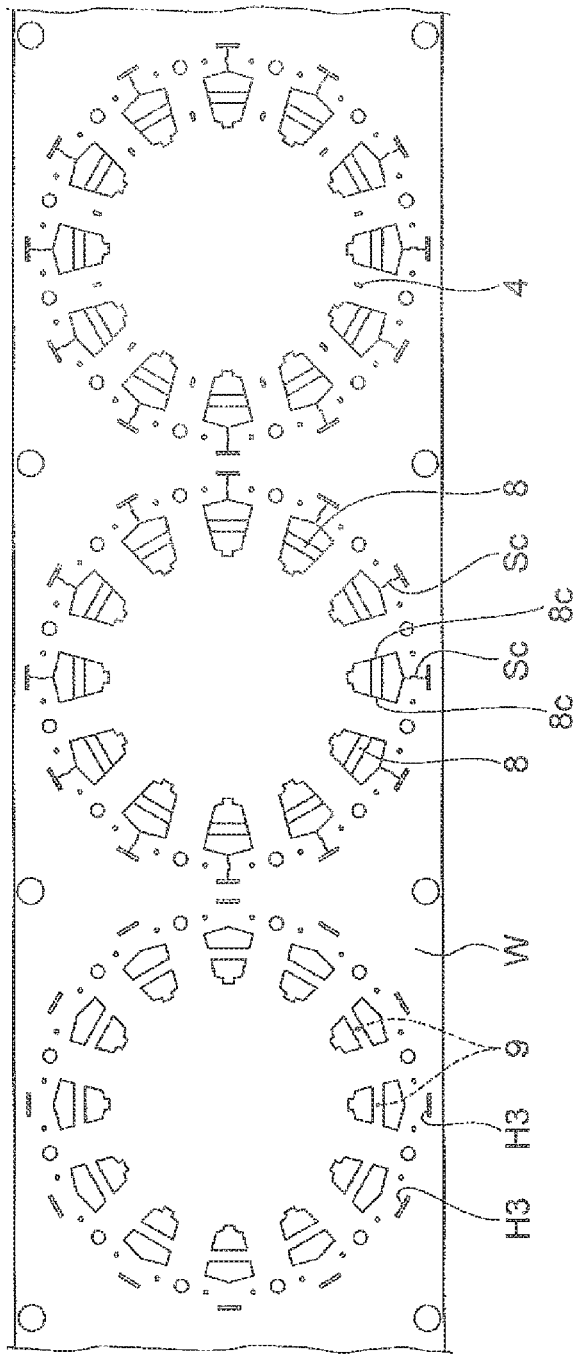

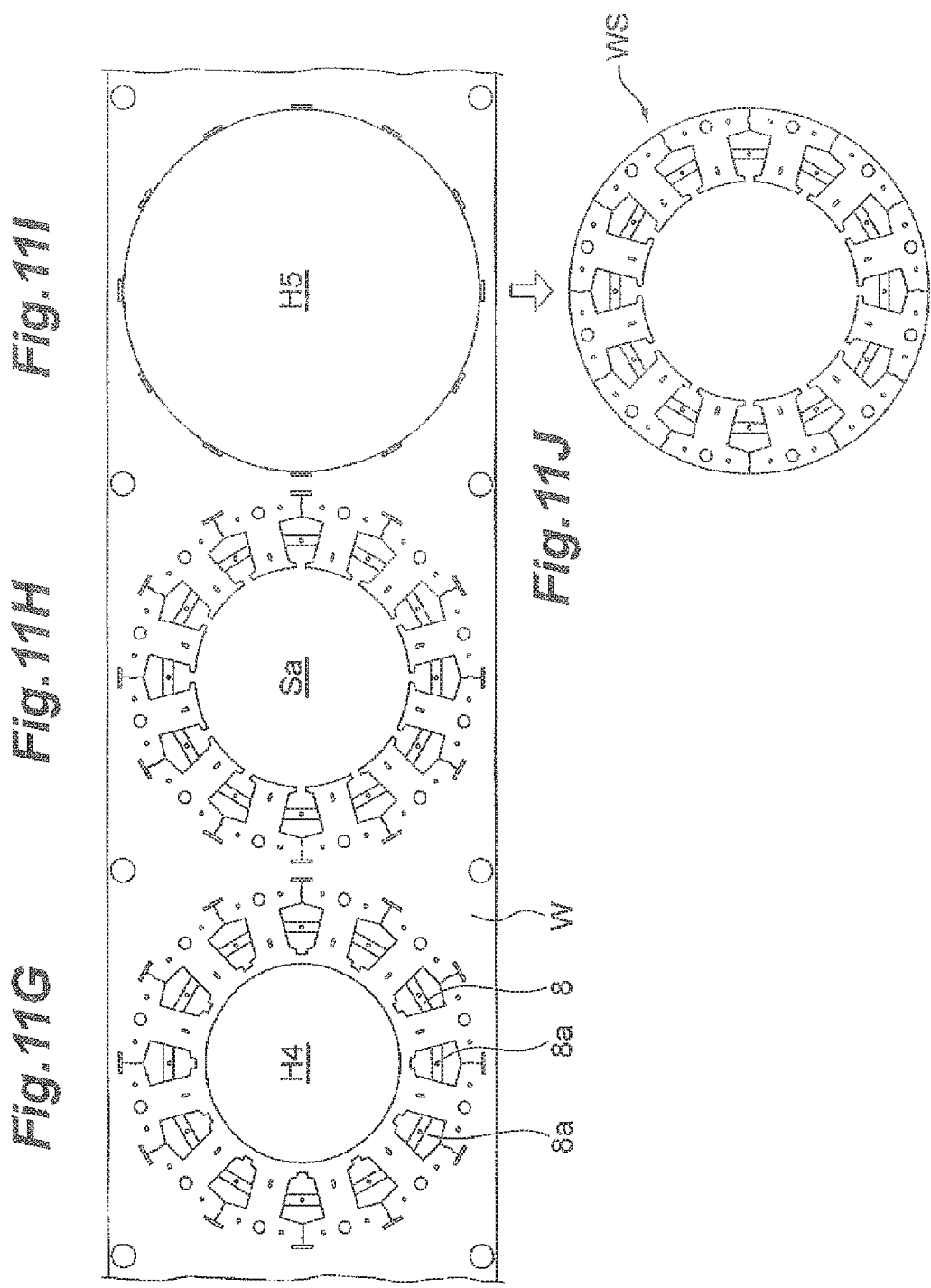

LAMINATE AND METHOD FOR MANUFACTURING THE SAME AND METHOD FOR MANUFACTURING LAMINATED CORE

CROSS-REFERENCE TO RELATED APPLICATION

This application is based upon and claims the benefit of priority from Japanese Patent Application No. 2014-248812, filed Dec. 9, 2014, the entire contents of which are incorporated herein by reference.

BACKGROUND

1. Field

This disclosure relates to a laminate and a method for manufacturing the same, and to a method for manufacturing a laminated core.

The laminated core is a component of a motor. The laminated core is formed by stacking a plurality of magnetic metal pieces each of which is processed in a predetermined shape and fastening the sheets together. The motor includes a rotor and a stator each of which contains a laminated core, and is produced through a step of winding a coil on the stator and a step of attaching a shaft to the rotor, for example. Motors incorporating laminated cores have been conventionally used as driving sources for refrigerators, air conditioners, hard disc drives, and electric tools, for example, and are also used as driving sources for hybrid cars these days.

As means for fastening vertically adjacent magnetic metal pieces together in a process of manufacturing a laminated core, swaging and welding are known. These fastening means are excellent in cost and work efficiency, and have been conventionally widely used. Alternatively, when higher priorities are given to greater torque and lower iron loss of a motor, instead of swaging or welding, the magnetic metal pieces may be fastened together by using resin material or adhesive.

2. Related Background Art

WO2010/082465 discloses a method for manufacturing a laminated core 110 by temporarily binding a plurality of core sheets 50 with fixtures 120 each having a swaged area and then permanently binding the sheets with resin material. Specifically, in the method described in WO2010/082465, a segmented stator 200 is manufactured through a step of temporarily binding together the core sheets 50 with the fixtures 120 arranged outside the laminated core 110, a step of permanently binding the laminated core 110 with an insulating resin 13 formed by die-cast molding, for example, and a step of removing the fixtures 120 from the laminated core 110 after permanently binding the laminated core 110 (see FIGS. 2 and 3 in WO2010/082465). By removing the fixtures 120 each having the swaged area from the laminated core 110 in the manufacturing process, the stator 200 having no swaged area is finally obtained.

SUMMARY

In this disclosure, a portion that has a swaged area formed thereon, is used for temporarily integrating a laminate, and is then removed from the laminate in a process of producing a product (laminated core) is referred to as a "temporarily-interlocking portion". A block into which such temporarily-interlocking portions are laminated and integrated together by swaged areas is referred to as a "temporarily-interlocking part".

A manufacturing method according to one aspect of this disclosure is a method for manufacturing a laminate used for manufacturing a laminated core including a circumferential yoke part and a plurality of magnetic pole parts radially extending from the yoke part. This method includes: feeding a metal sheet drawn from a roll thereof to a progressive die; stamping out a plurality of workpieces from the metal sheet in the progressive die, wherein each of the workpiece comprises a temporarily-interlocking portion between adjacent magnetic pole portions; and obtaining the laminate including the workpieces integrated together by the temporarily-interlocking portion. Each workpiece includes a circumferential yoke portion (portion constituting the yoke part of the laminate), a plurality of magnetic pole portions (portions constituting each magnetic pole part of the laminate) radially extending from the yoke portion, and the temporarily-interlocking portion (portion constituting a temporarily-interlocking part of the laminate) provided between the adjacent magnetic pole portions.

BRIEF DESCRIPTION OF THE DRAWINGS

FIG. 7 is a schematic diagram illustrating one example of a stamping device.

FIGS. 8A to 8J are plan views illustrating an overall layout of stamping serially performed by a progressive die.

FIGS. 9A to 9C are plan views illustrating a layout of the stamping in an initial stage.

FIGS. 10D to 10F are plan views illustrating a layout of the stamping in a middle stage.

FIGS. 11G to 11J are plan views illustrating a layout of the stamping in a final stage.

DETAILED DESCRIPTION

Figure 1:
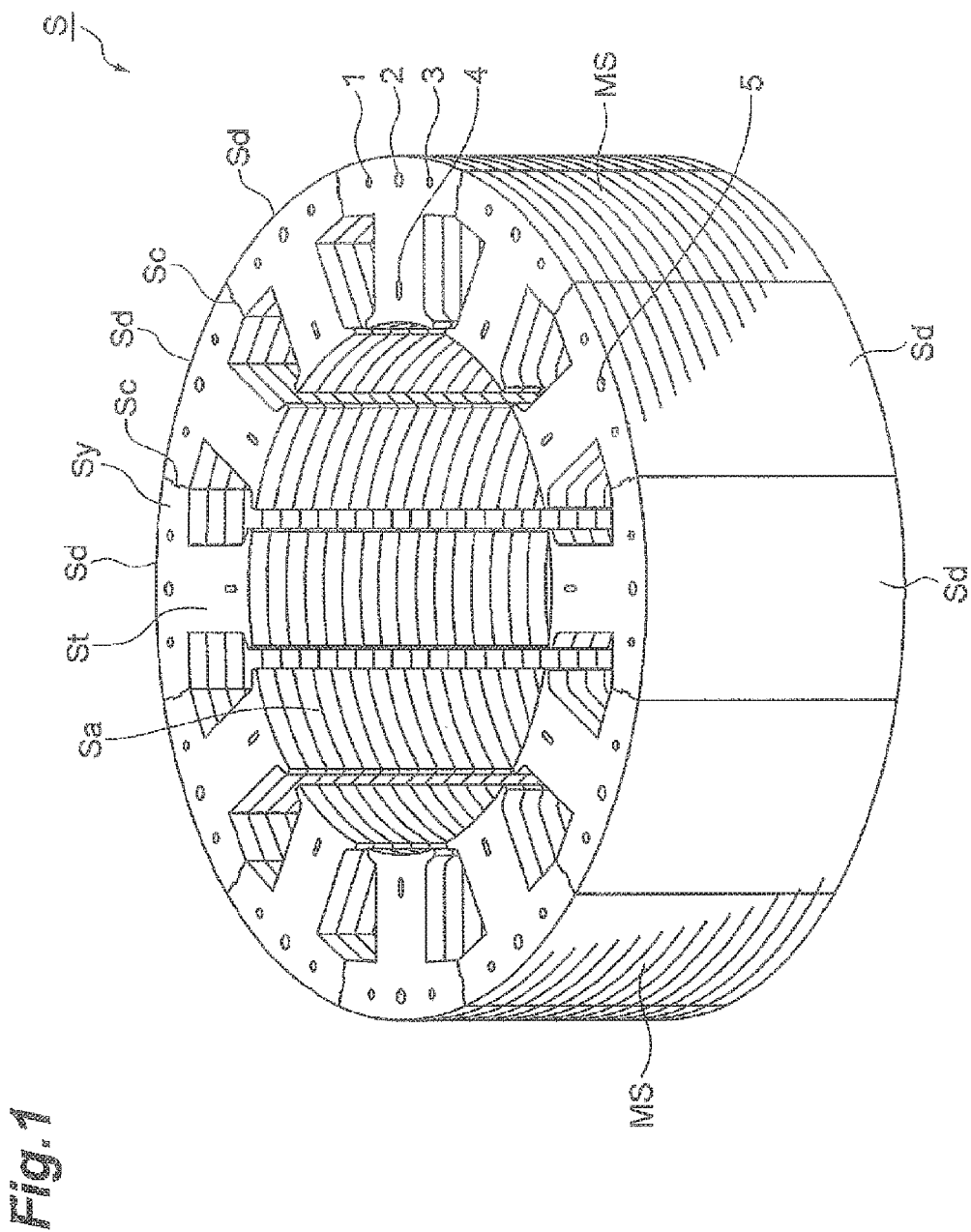
FIG. 1 is a perspective view illustrating one example of a laminated core for a stator.

Hereinafter, a plurality of embodiments of the present invention will be described with reference to the accompanying drawings. In the description of the drawings, the same elements will be designated by the same reference numerals and a duplicate description thereof will be omitted. The drawings and the related technologies are provided in order to describe the embodiments of the present invention, and do not limit the scope of the present invention.

<Laminated Core Constituting a Stator>

Figure 2:
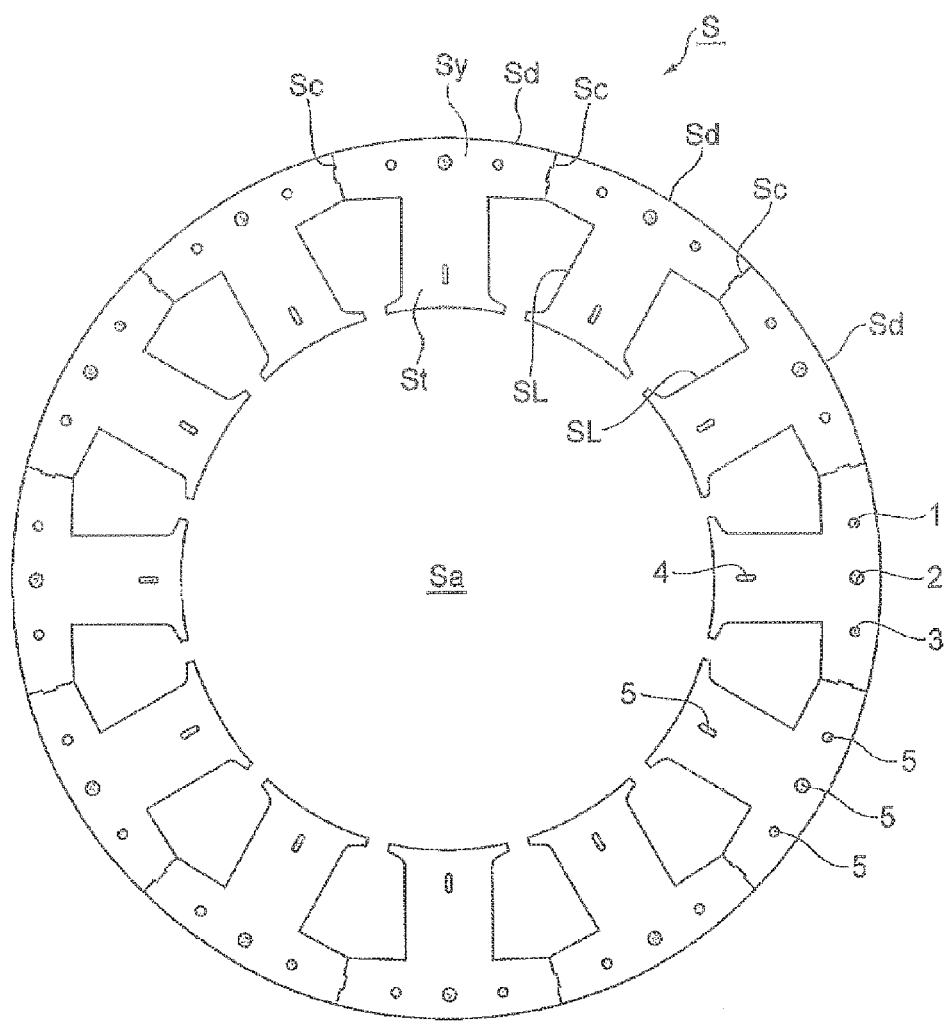
FIG. 2 is a plan view of the laminated core depicted in FIG. 1.

FIG. 1 and FIG. 2 are a perspective view and a plan view, respectively, of a segmented laminated core S constituting a stator. The shape of the laminated core S is substantially cylindrical, and an opening Sa positioned in its central part is configured to arrange a rotor (not depicted). The laminated core S has a substantially circumferential yoke part Sy and magnetic pole parts St extending from the inner periphery of the yoke part Sy toward the center. The magnetic pole parts St are also called a teeth portion because of their shape. Depending on the usage and performance of the motor, the width of the yoke part Sy is about 2 to 40 millimeters.

Figure 3:
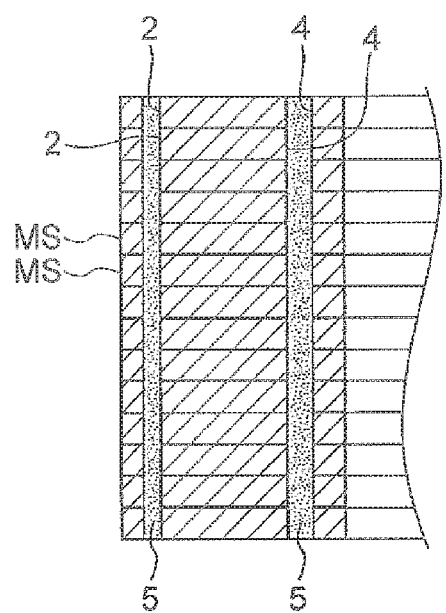
FIG. 3 is a schematic partial longitudinal sectional view of the laminated core depicted in FIG. 1.

The laminated core S includes a total of 12 segments Sd, and each segment Sd has one magnetic pole part St. Thus, the laminated core S has 12 magnetic pole parts St in total. Note that the number of the segments Sd (the number of the magnetic pole parts St) is not limited to 12. Between the adjacent segments Sd, cuts Sc are formed by cutting and bending. The cuts Sc are formed so that protrusions fit into depressions, and accordingly the laminated core S is configured to be separated into the respective segments Sd when receiving a moderate impact. The segments Sd each have a resin filling holes 1, 2, and 3 formed in the yoke part Sy and a resin filling hole 4 formed in the magnetic pole part St. By filling the resin filling holes 1, 2, 3, and 4 with a resin material 5, a plurality of metal pieces MS constituting the laminated core S are integrated together (see FIG. 3).

As the resin material 5, for example, a thermosetting resin can be used. Specific examples of the thermosetting resin include resin compositions containing an epoxy resin, a curing initiator, and an additive. Examples of the additive include a filler, a flame retardant, and a stress-lowering agent. The resin material 5 sticks the vertically adjacent metal pieces MS together. As the resin material 5, a thermoplastic resin may be used.

<Laminate for a Stator Including Temporarily-Interlocking Parts>

Figure 4:
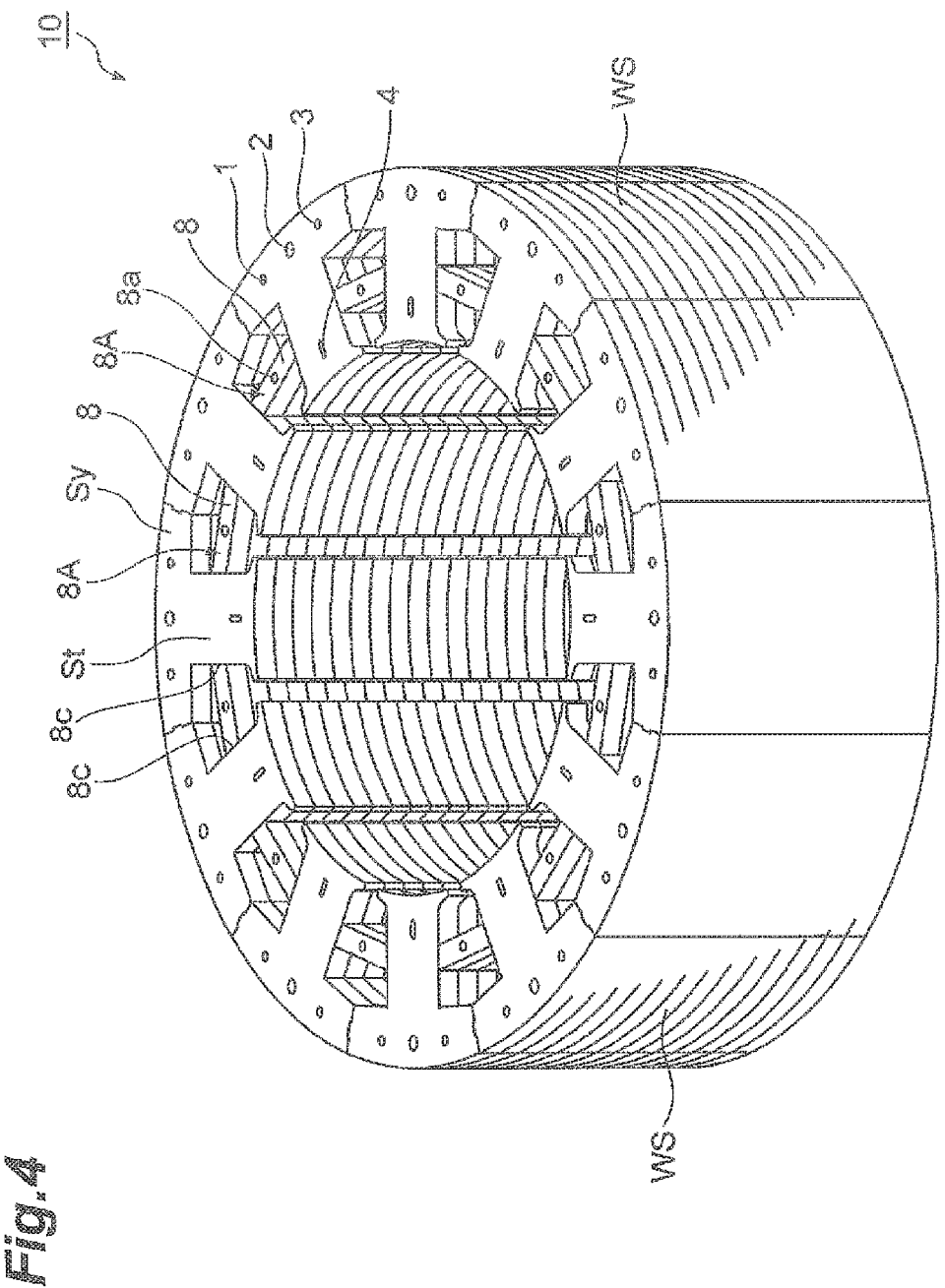
FIG. 4 is a perspective view illustrating one example of a laminate including temporarily-interlocking parts each between adjacent magnetic pole parts.
Figure 5:
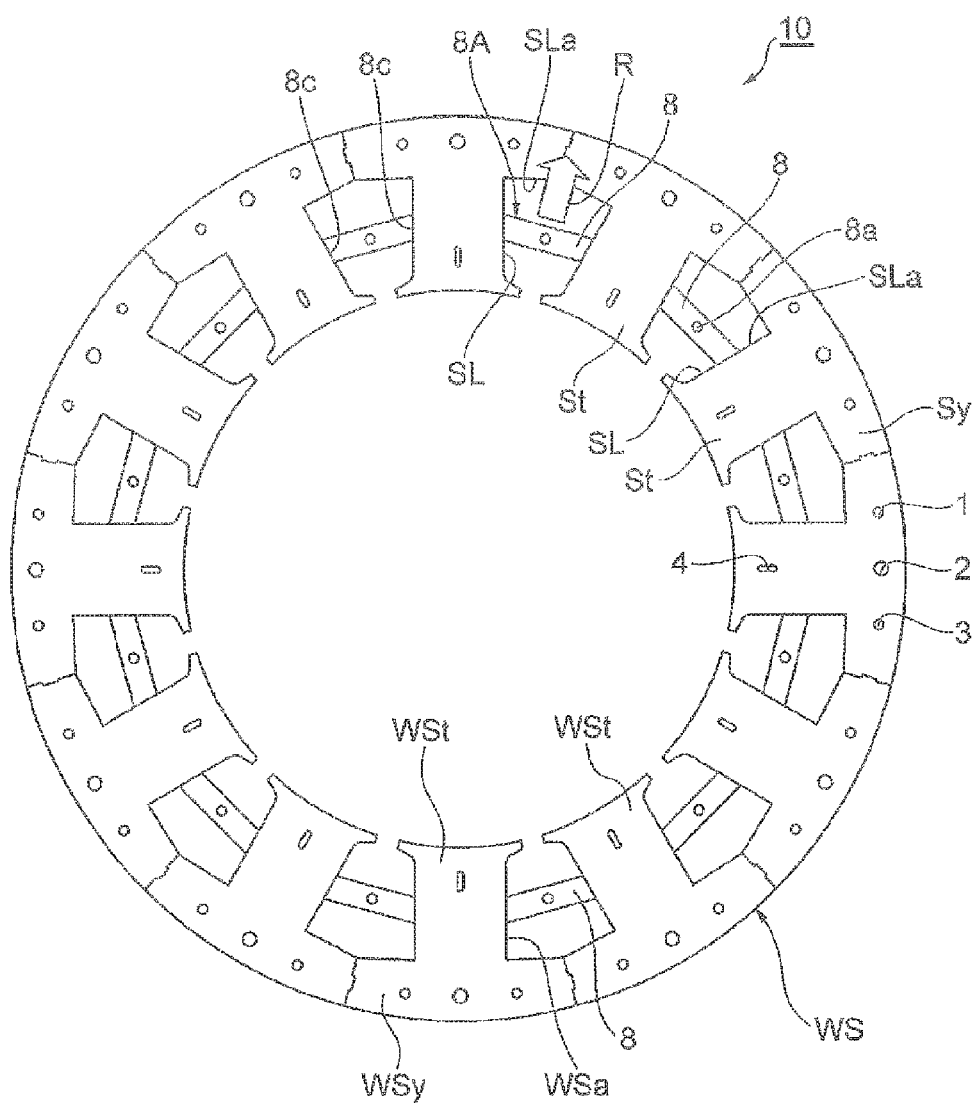
FIG. 5 is a plan view of the laminate depicted in FIG. 4.

FIG. 4 and FIG. 5 are a perspective view and a plan view, respectively, of a laminate 10 used for manufacturing the laminated core S. The laminate 10 has temporarily-interlocking parts 8A each in a region (hereinafter, referred to as "slot SL") between the adjacent magnetic pole parts St. The temporarily-interlocking parts 8A each are provided at a middle position between the adjacent magnetic pole parts St, and connect the adjacent magnetic pole parts St to each other. Each temporarily-interlocking part 8A is structured with a plurality of temporarily-interlocking portions 8 being laminated. Each temporarily-interlocking portion 8 is formed in a process of stamping a metal sheet to produce a workpiece WS (see FIG. 11J). Each temporarily-interlocking portion 8 is a belt-like member having a width of 3 to 40 millimeters for strength, and has a swaged area 8a formed in its center.

Referring to FIG. 5, each workpiece WS constituting the laminate 10 will be described. In plan view, the workpiece WS has substantially the same outer shape as that of the laminate 10. Specifically, the workpiece WS includes a circumferential yoke portion WSy (portion constituting the yoke part Sy of the laminate 10), a plurality of magnetic pole portions WSt (portions constituting the magnetic pole parts St of the laminate 10) radially extending from the yoke portion WSy, and temporarily-interlocking portions 8 (portions constituting the temporarily-interlocking parts 8A of the laminate 10) each between the adjacent magnetic pole portions WSt. Each temporarily-interlocking portion 8 is provided between the adjacent magnetic pole portions WSt so that a space WSa is formed between the temporarily-interlocking portion 8 and the inner circumferential surface of the yoke portion WSy. A plurality of workpieces WS are integrated by the temporarily-interlocking portions 8 into the laminate 10. The laminate 10 includes the circumferential yoke part Sy, the magnetic pole parts St radially extending from the yoke part Sy, and the temporarily-interlocking parts 8A each provided between the adjacent magnetic pole parts St. Each temporarily-interlocking part 8A is provided between the adjacent magnetic pole parts St so that a space SLa is formed between the temporarily-interlocking part 8A and the inner circumferential surface of the yoke part Sy. Herein, the temporarily-interlocking part 8A is a block that is formed by integrating the temporarily-interlocking portions 8 together.

Figure 6A:
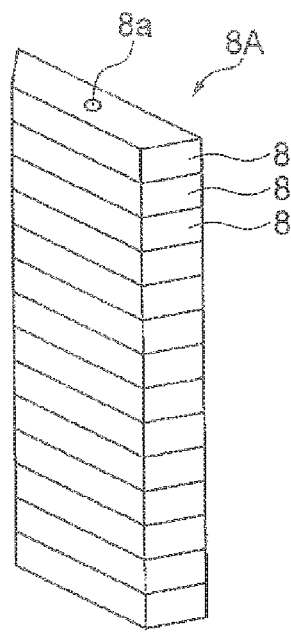
FIG. 6A is a perspective view schematically illustrating one example of each temporarily-interlocking part.
Figure 6B:
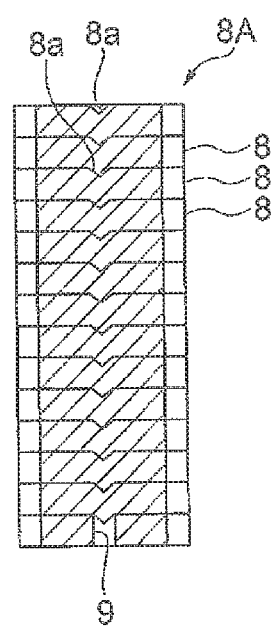
FIG. 6B is a schematic longitudinal sectional view of the temporarily-interlocking part.

The temporarily-interlocking portions 8 the number of which is the same as that of the workpieces WS constituting the laminate 10 overlap each other, thereby constituting the temporarily-interlocking part 8A (see FIG. 6A). In order to prevent a plurality of laminates 10 from being fastened to each other when the laminates 10 are stacked together, each temporarily-interlocking portion 8 positioned at the lowermost surface of each laminate 10 has a punched hole 9 instead of the swaged area 8a (see FIG. 6B). At each connecting part between each magnetic pole portion WSt and each temporarily-interlocking portion 8, a cut 8c is formed by push-back.

As depicted in FIG. 5, the spacing between the adjacent magnetic pole parts St becomes wider from the tip side of the magnetic pole parts St toward the yoke part Sy side. As depicted in FIG. 6A, each temporarily-interlocking part 8A has a substantially isosceles trapezoidal shape in plan view, which is advantageous because the temporarily-interlocking part 8A is easily removed radially outward of the laminate 10 (in the direction of the arrow R in FIG. 5). The space SLa with a certain size existing between the temporarily-interlocking part 8A and the inner circumferential surface of the yoke part Sy is advantageous in that the temporarily-interlocking part 8A is easily removed in the direction of the arrow R and the temporarily-interlocking part 8A can be easily picked up from the space SLa.

<Stamping Device>

FIG. 7 is a schematic diagram illustrating one example of a stamping device for producing workpieces WS (metal pieces MS each having temporarily-interlocking portions 8) constituting a laminate 10. The stamping device 100 depicted in FIG. 7 includes an uncoiler 110 on which a roll C is mounted, a feeder 130 configured to feed a metal sheet W drawn from the roll C, a progressive die 140 configured to perform stamping on the metal sheet W, and a press machine 120 configured to cause the progressive die 140 to operate.

The uncoiler 110 rotatably holds the roll C. The length of the metal sheet (for example, a magnetic steel sheet) constituting the roll C is 500 to 10000 meters, for example. The thickness of the metal sheet constituting the roll C may be about 0.1 to 0.5 millimeter, or may be about 0.1 to 0.3 millimeter from a viewpoint of achieving more excellent magnetic properties of the laminated core S. The width of the metal sheet W may be about 50 to 500 millimeters.

The feeder 130 has a pair of rollers 130a and 130b that sandwich the metal sheet W from above and below. The metal sheet W is fed into the progressive die 140 via the feeder 130. The progressive die 140 is a device configured to serially perform stamping, cutting-and-bending processing, and push-back, for example, on the metal sheet W.

<Method for Manufacturing a Laminated Core>

The following describes a method for manufacturing a laminated core S. In the method for manufacturing a laminated core S, a laminated core S is manufactured through a process of producing a laminate 10 integrated by the temporarily-interlocking portions 8 (steps (A) to (C) below) and a process of producing a laminated core S from the laminate 10 (steps (D) and (E) below). More specifically, the method for manufacturing a laminated core S includes the following steps:

(A) a step of feeding a metal sheet W drawn from the roll C to the progressive die,
(B) a step of performing stamping on the metal sheet W by the progressive die 140 to obtain a workpiece WS having temporarily-interlocking portions 8 each between adjacent magnetic pole portions WSt,
(C) a step of stacking a plurality of workpieces WS to integrate these workpieces WS together by the temporarily-interlocking portions 8,
(D) a step of filling the resin filling holes 1, 2, 3, and 4 of the laminate 10 obtained at the step (C) with a resin material to fasten the laminate 10, and
(E) a step of removing the temporarily-interlocking parts 8A from the laminate 10.

To begin with, the roll C of the metal sheet is prepared, and is mounted on the uncoiler 110. The metal sheet W drawn from the roll C is fed to the progressive die 140 (step (A)).

In the progressive die 140, workpieces WS are serially produced by performing stamping on the metal sheet W (step (B)). Referring to FIGS. 8A to 11J, the step (B) will be described. FIGS. 8A to 8J are plan views illustrating an overall layout of stamping serially performed by the progressive die 140. FIGS. 8A to 8I illustrate a state of the metal sheet W after steps B1 to B9 described below are performed, and FIG. 8J is a plan view illustrating a workpiece WS that is stamped out at the step B9. FIGS. 9A to 9C are enlarged views of FIGS. 8A to 8C, FIGS. 10D to 10F are enlarged views of FIGS. 8D to 8F, and FIGS. 11G to 11J are enlarged views of FIGS. 8G to 8J, respectively. As long as press loads can be balanced, the layout of stamping is not limited to that depicted in FIGS. 8A to 8J.

The step B1 is a step of forming pilot holes P on the metal sheet W (see FIG. 8A and FIG. 9A). The pilot holes P are holes for positioning the metal sheet W in the progressive die 140.

The step B2 is a step of further forming openings H1 and H2 each pair of which constitute each slot SL and resin filling holes 2 on the metal sheet W (see FIG. 8B and FIG. 9B).

The step B3 is a step of further forming resin filling holes 1 and 3 on the metal sheet W (see FIG. 8C and FIG. 9C).

The step B4 is a step of further forming slits H3 for retracting a cutter for cutting and bending on the metal sheet W (see FIG. 8D and FIG. 10D). Forming the slits H3 on the metal sheet W before forming cuts Sc at joints of segments Sd (at step B5) makes it possible to sufficiently prevent deformation of material and chipping of the cutter when forming the cuts Sc by the cutter. When the object to be processed is a workpiece WS positioned in the lowermost layer, punched holes 9 are formed at positions where swaged areas 8a are formed at this step.

The step B5 is a step of further forming cuts 8c at ends of the temporarily-interlocking portions 8 and cuts Sc at joints of segments Sd by push-back and cutting-and-bending processing, respectively, on the metal sheet W (see FIG. 8E and FIG. 10E).

The step B6 is a step of further forming resin filling holes 4 on the metal sheet W (see FIG. 8F and FIG. 10F).

The step B7 is a step of further forming an opening H4 on the metal sheet W (see FIG. 8G and FIG. 11G). When the object to be processed is not a workpiece WS positioned at the lowermost layer, as depicted in FIG. 11G swaged areas 8a are further formed on the metal sheet W at this step. Alternatively, by adjusting the stroke of the cutter, the swaged areas 8a may be formed at the step B4, or the punched holes 9 may be formed at the step B7.

The step B8 is a step of further forming an opening Sa on the metal sheet W (see FIG. 8H and FIG. 11H).

The step B9 is a step of performing stamping at the outer circumference of a workpiece WS (to form an opening H5) (see FIG. 8I and FIG. 11I).

Workpieces WS are obtained through the above-described steps B1 to B9 (see FIG. 8J and FIG. 11J). Subsequently, a predetermined number of the workpieces WS are stacked together, and these workpieces WS are coupled to each other by the swaged areas 8a to obtain a laminate 10 depicted in FIGS. 4 and 5 (step (C)). By filling the resin filling holes 1, 2, 3, and 4 of the laminate 10 with the resin material 5, the laminate 10 is fastened (step (D)). After fastening the laminate 10 with the resin material 5, the temporarily-interlocking parts 8A are removed from the laminate 10 to obtain a laminated core S (step (D)). Herein, as long as the laminate 10 does not come apart after removing the temporarily-interlocking parts 8A, the temporarily-interlocking parts 8A may be removed before the fastening with the resin material 5. For example, in a state in which the laminate 10 is fixed on a resin filling device, the temporarily-interlocking parts 8A may be removed before the filling with the resin material 5, and then the resin filling holes 1, 2, 3, and 4 may be filled with the resin material 5. Furthermore, the temporarily-interlocking parts 8A may be removed at the same time as the filling with the resin material 5.

Figure 12:
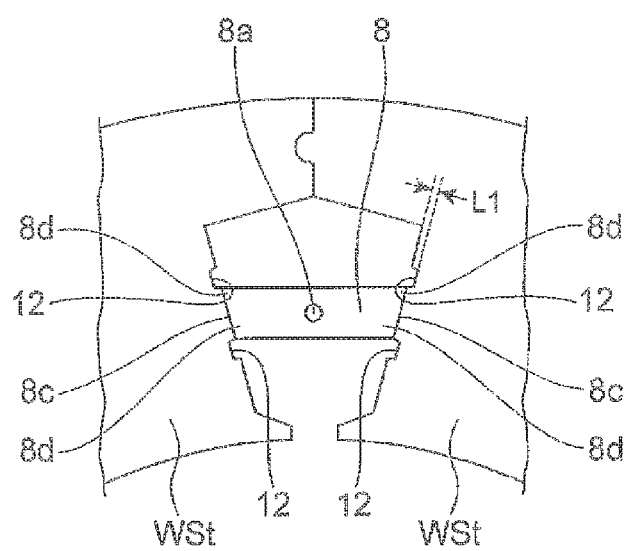
FIG. 12 is a plan view illustrating depressions formed on sides of magnetic pole portions in an exaggerated manner.

In the foregoing, one embodiment of this disclosure has been described, this disclosure is not limited to the above-described embodiment. For example, in the above-described embodiment, a case has been exemplified in which sides of magnetic pole portions WSt that are in contact with the ends of each temporarily-interlocking portion 8 are linearly formed. Alternatively, as depicted in FIG. 12, on the sides of the magnetic pole portions WSt, depressions 12 may be formed at positions corresponding to corners 8d of the temporarily-interlocking portion 8. When the cuts 8c are formed by a cutter (punch) at the step B5, the depressions 12 can play a role in retracting the cutter. In other words, forming these depressions 12 can prevent formation of whisker-like burrs when the cuts 8c of each temporarily-interlocking portion 8 are formed. The depth (depth L1 in FIG. 12) of the depressions 12 may be about 0.02 to 1 millimeter.

Figure 13A:
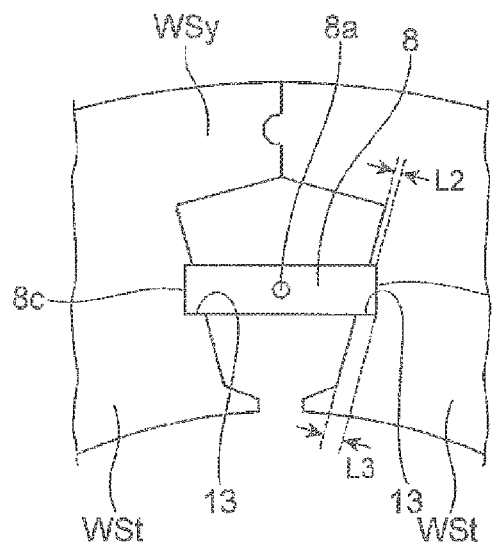
FIGS. 13A to 13D are plan views illustrating variations of shapes of a temporarily-interlocking portion and sides of the magnetic pole portions in an exaggerated manner.
Figure 13B:
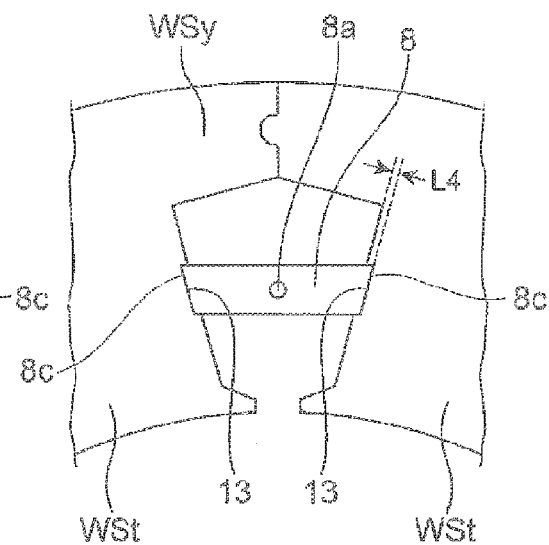
Figure 13C:
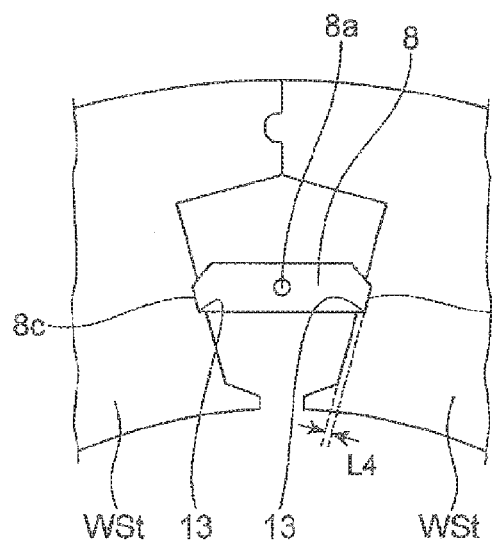

In the above-described embodiments, cases have been exemplified in which straight cuts 8c are formed. Alternatively, in order to enhance the joint strength of each temporarily-interlocking portion 8, as depicted in FIGS. 13A to 13C, concaves 13 for engaging the temporarily-interlocking portion 8 may be formed on the sides of the magnetic pole portions WSt. By adjusting the area (length in plan view) of the contact surface between each end of the temporarily-interlocking portion 8 and the corresponding magnetic pole portion WSt, ease of removing (difficulty of removing) the temporarily-interlocking part 8A can be adjusted.

Figure 13D:
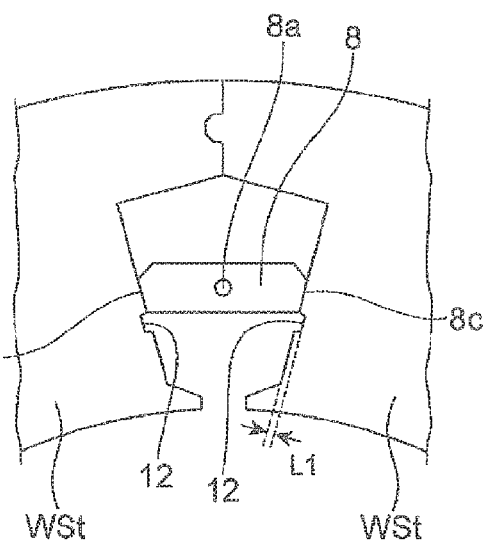

The temporarily-interlocking portion 8 depicted in FIG. 13A is substantially rectangular in plan view. The depth L2 of the concaves 13 on the yoke portion WSy side may be about 0 to 1 millimeter, and the depth L3 on the tip side may be about 0.02 to 2 millimeters. The temporarily-interlocking portion 8 depicted in FIG. 13B is substantially isosceles trapezoidal in plan view, and the end surfaces of the temporarily-interlocking portion 8 and the sides of the magnetic pole portion WSt are parallel to each other. The depth L4 of the concaves 13 may be about 0.02 to 1 millimeter. The temporarily-interlocking portion 8 depicted in FIG. 13C is a modification of the temporarily-interlocking portion 8 depicted in FIG. 13B, and each end of the temporarily-interlocking portion 8 on the yoke portion WSy side is formed in a tapered shape. Using these structures is advantageous in that the temporarily-interlocking part 8A is easily removed radially outward of the laminate 10 even when the concaves 13 are formed. The temporarily-interlocking portion 8 depicted in FIG. 13D is a modification of the temporarily-interlocking portion 8 depicted in FIG. 13C, and each end of the temporarily-interlocking portion 8 on the yoke portion WSy side is formed in a tapered shape. Reducing the area of the contact surface between each end of the temporarily-interlocking portion 8 and the corresponding magnetic pole portion WSt (shortening the length in plan view) enables the temporarily-interlocking part 8A to be easily removed. This tapered shape of the ends of the temporarily-interlocking portion 8 on the yoke portion WSy side eliminates the need to form the depressions 12 on the corresponding sides of the magnetic pole portions WSt.

Figure 14A:
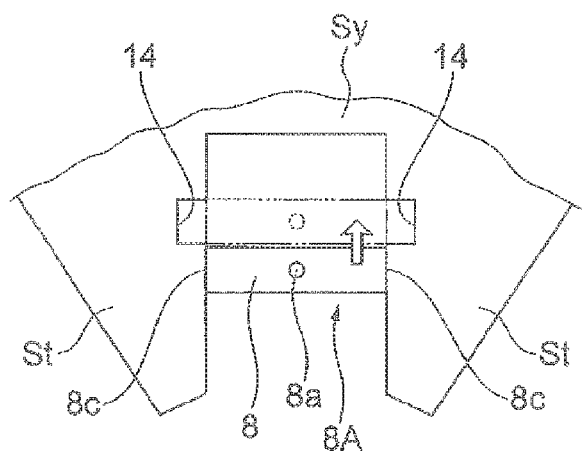
FIG. 14A and FIG. 14B are plan views each schematically illustrating a temporarily-interlocking portion provided between two magnetic pole portions extending parallel to each other.
Figure 14B:
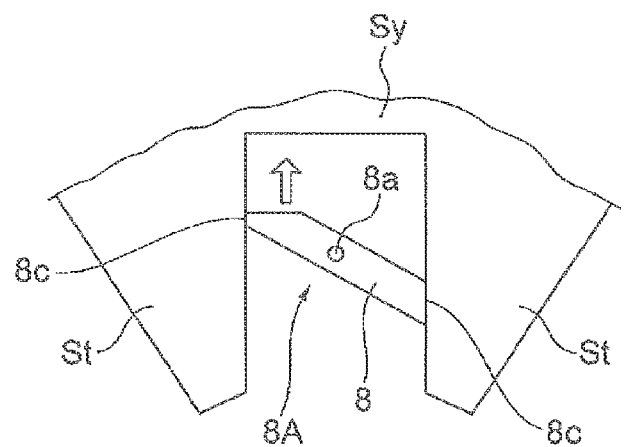

In the above-described embodiments, cases have been exemplified in which the spacing between the adjacent magnetic pole parts St becomes wider from the tip side of the magnetic pole parts St toward the yoke part Sy side, but the sides of the adjacent magnetic pole parts St may extend parallel to each other. In this case, by devising the shape of the magnetic pole parts St and/or the shape of the temporarily-interlocking portion 8 as depicted in FIG. 14A and FIG. 14B, a laminate from which the temporarily-interlocking part 8A is easily removed can be manufactured. The sides of the magnetic pole parts St (magnetic pole portions WSt) depicted in FIG. 14A have grooves 14, near the temporarily-interlocking part 8A (temporarily-interlocking portion 8), for removing the temporarily-interlocking part 8A toward the yoke part Sy side. Forming such grooves 14 in these positions advantageously allows the temporarily-interlocking part 8A to be easily removed radially outward of the laminate 10 as indicated by the dashed and double-dotted line in FIG. 14A. FIG. 14B schematically illustrates a shape of the temporarily-interlocking portion 8 that has been devised, in which the temporarily-interlocking portion 8 is provided tilting with respect to the tangential direction of the laminate 10. In this mode also, by adjusting the area (length in plan view) of the contact surface between each end of the temporarily-interlocking portion 8 (temporarily-interlocking part 8A) and the corresponding magnetic pole part St, ease of removing (difficulty of removing) the temporarily-interlocking part 8A can be adjusted.

In the above-described embodiments, cases have been exemplified in which the temporarily-interlocking part 8A is removed radially outward, but the temporarily-interlocking part may be removed radially inward when the magnetic pole parts St are formed so that spacing therebetween decreases toward the radially inner side, or when the stator is of an outer rotor type.

Figure 15:
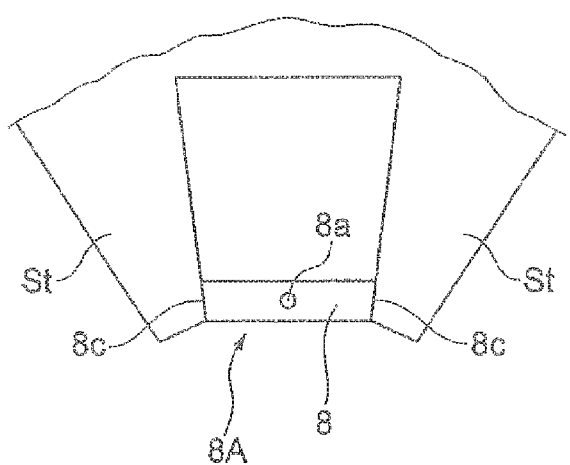
FIG. 15 is a plan view schematically illustrating a temporarily-interlocking portion provided between two magnetic pole portions on their tips.

In the above-described embodiments, cases have been exemplified in which the temporarily-interlocking portion 8 is formed at a middle position between the adjacent magnetic pole parts St in the radial direction, but the temporarily-interlocking portion 8 (temporarily-interlocking part 8A) may be formed on the tip side of the magnetic pole parts St as depicted in FIG. 15.

In the above-described embodiments, cases have been exemplified in which only workpieces WS are stamped out from one metal sheet W, but both types of the workpieces WS and workpieces for rotors may be stamped out from one metal sheet W. For example, the workpieces for rotors may be manufactured by adding stamping for rotors into the layout depicted in FIGS. 8A to 8J and forming the opening H4 depicted in FIG. 11G. Furthermore, the stamping may be performed on a plurality of metal sheets W that are stacked together to obtain the workpieces WS.

In the above-described embodiments, temporarily-interlocking parts 8A each formed by laminating temporarily-interlocking portions 8 the number of which is the same as that of workpieces WS constituting a laminate 10 have been exemplified, and cases have been exemplified in which these temporarily-interlocking parts 8A are formed in all slots SL. However, temporarily-interlocking parts (not depicted) each including temporarily-interlocking portions 8 the number of which is smaller than that of the workpieces WS constituting a laminate 10 may be formed in optional slots SL.

Figure 16:
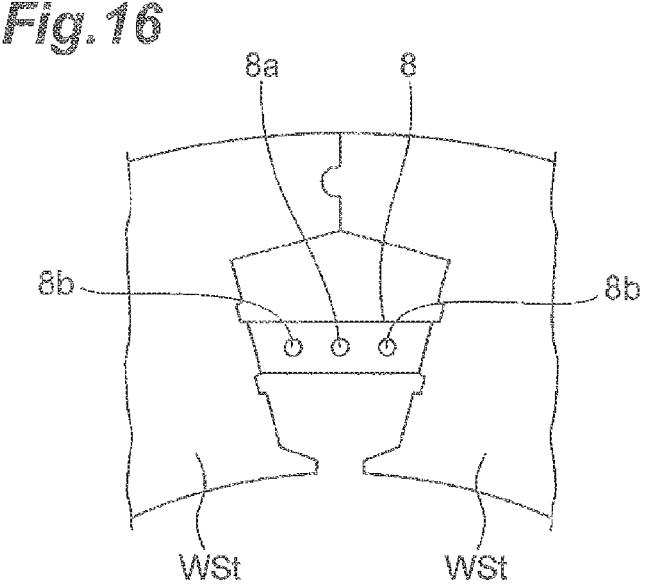
FIG. 16 is a plan view schematically illustrating one example of a temporarily-interlocking portion including adjustment portions.

In the above-described embodiments, temporarily-interlocking portions 8 each having only the swaged area 8a formed thereon have been exemplified, but adjustment portions 8b for adjusting tension on each temporarily-interlocking portion 8 may be formed on each temporarily-interlocking portion 8 (see FIG. 16). Reducing the tension on the temporarily-interlocking portion 8 allows the temporarily-interlocking part 8A to be easily removed. Conversely, increasing the tension on the temporarily-interlocking portion 8 can make it difficult to remove the temporarily-interlocking part 8A. When tension on the temporarily-interlocking portion 8 is high, through holes may be formed as the adjustment portions 8b on the temporarily-interlocking portion 8 so as to reduce the tension. When tension on the temporarily-interlocking portion 8 is low, in order to increase the tension, swaged areas may be additionally formed as the adjustment portions 8b on the temporarily-interlocking portion 8, or crushed areas or half-blanked areas may be formed on the temporarily-interlocking portion 8. The above-described swaged areas formed as the adjustment portions 8b on the temporarily-interlocking portion 8 may be used for coupling the temporarily-interlocking portion 8 to another one. FIG. 16 illustrates a case in which two adjustment portions 8b are formed with one swaged area 8a interposed therebetween, but the number and the positions of the adjustment portions 8b are not limited to this.

In the above-described embodiments, cases have been exemplified in which the laminate 10 is finally fastened by the resin material 5, but the laminate 10 may be fastened by welding or adhesive instead of the resin material 5. In the above-described embodiments, a laminated core S for a segmented stator and a method for manufacturing the laminated core S have been exemplified, but this disclosure may be applied to an integrated laminated core.

Paragraph [0024] of WO2010/082465 contains the expression "After the laminated core 110 is integrally formed by the insulating resin 13 and coils are wound thereon, the fixture 120 is slid in the laminating direction (direction A in FIG. 2) to be removed from the fitting depression 11*c* of the back yoke part 11*a*". In the invention described in WO2010/082465, the direction of removing the fixture 120 is limited to the laminating direction, and there is room for improvement in this point. In addition, when the fixture 120 is slid over the laminated core 110, metal sheets constituting the laminated core 110 may be flipped.

According to the embodiments of this disclosure, a laminate including temporarily-interlocking parts each in a region (also referred to as "slot") between the adjacent magnetic pole parts is manufactured. For example, spacing between the adjacent magnetic pole parts that becomes wider from the tip side of the magnetic pole parts toward the yoke part side is advantageous in that the temporarily-interlocking part formed between the adjacent magnetic pole parts is easily removed radially outward (see the arrow R in FIG. 5). However, even if sides of two adjacent magnetic pole parts extend parallel to each other, by devising the shape of the magnetic pole parts and/or the shape of the temporarily-interlocking portions, a laminate from which the temporarily-interlocking parts is easily removed can be manufactured (see FIGS. 14A and 14B). For example, when sides of adjacent two magnetic pole parts extend parallel to each other and a temporarily-interlocking part extends in a direction orthogonal to the magnetic pole parts, grooves for removing the temporarily-interlocking portion (temporarily-interlocking part) may be formed on the sides of the magnetic pole portions.

The sides of the magnetic pole portions may have depressions at positions corresponding to the corners of the temporarily-interlocking portion (see FIG. 12). These depressions can be used to retract a cutter for forming the ends of the temporarily-interlocking portion. Forming such depressions on the sides of the magnetic pole portions can sufficiently prevent formation of thin thread-like burrs (also called "whisker-like burrs") even if the temporarily-interlocking portion is formed by push-back (see FIG. 5 in Japanese Unexamined Patent Publication No. 2011-239591, for example) in a die.

From viewpoints of achieving a joint strength between the magnetic pole parts and the temporarily-interlocking part equal to or higher than a required strength and improving removability of the temporarily-interlocking part from the magnetic pole parts, the temporarily-interlocking portion may have sides extending parallel to the sides of the magnetic pole portions. Alternatively, the sides of the magnetic pole portion may have concaves for engaging the temporarily-interlocking portion. From the same viewpoints, the temporarily-interlocking portion may have an adjustment portion for adjusting tension between the magnetic pole portions.

According to the embodiments of this disclosure, a laminate for manufacturing a laminated core for a segmented stator can be manufactured. For example, by providing temporarily-interlocking parts to all the slots, a laminated core for a segmented stator including a plurality of segments can be collectively manufactured, and even if the workpieces are discharged from the die in a laminated state, handling is facilitated without falling apart of the individual parts during the discharge and thereafter (see FIGS. 4 and 5).

According to the embodiments of this disclosure, a laminated core can be manufactured from the laminate including the temporarily-interlocking parts. In other words, by removing the temporarily-interlocking parts from the laminate, the laminated core that does not have swaged areas can be finally obtained. In order to prevent the metal sheets constituting the laminate from being flipped when removing the temporarily-interlocking parts from the laminate, at the step of removing the temporarily-interlocking parts each of which is formed by laminating temporarily-interlocking portions, the temporarily-interlocking parts may be removed from between the adjacent magnetic pole parts (slots) in the radial direction of the laminate.

According to the embodiments of this disclosure, a laminate is provided that can be used for manufacturing a laminated core, and the temporarily-interlocking parts can be removed from the laminate in a sufficiently easy manner. Specifically, this laminate includes a circumferential yoke part, a plurality of magnetic pole parts radially extending from the yoke part, and temporarily-interlocking parts each formed between the adjacent magnetic pole parts. This laminate is useful for manufacturing a laminated core that does not have swaged areas because the temporarily-interlocking parts can be removed in a sufficiently easy manner.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

What is claimed is:

1. A method for manufacturing a laminate used for manufacturing a laminated core, the method comprising the steps of:
   feeding a metal sheet drawn from a roll thereof to a progressive die;
   stamping out a plurality of workpieces from the metal sheet in the progressive die, wherein each of the workpiece comprises:
   a circumferential yoke portion,
   a plurality of magnetic pole portions radially extending from the yoke portion, and
   a temporarily-interlocking portion provided between the magnetic pole portions adjacent to each other; and
   obtaining the laminate including the workpieces integrated by the temporarily-interlocking portion, wherein the laminate comprises:
   a circumferential yoke part,
   a plurality of magnetic pole parts radially extending from the yoke part, and
   a temporarily-interlocking part between the magnetic pole parts adjacent to each other.

2. A method for manufacturing a laminate used for manufacturing a laminated core comprising a circumferential yoke part and a plurality of magnetic pole parts radially extending from the yoke part, the method comprising the steps of:
   feeding a metal sheet drawn from a roll thereof to a progressive die;
   stamping out a plurality of workpieces from the metal sheet in the progressive die, wherein each of the workpiece comprises a temporarily-interlocking portion between adjacent magnetic pole portions; and
   stacking the workpieces to integrate these workpieces together by the temporarily-interlocking portions.

3. The method according to claim 1, wherein sides of the magnetic pole portions have depressions at positions corresponding to corners of the temporarily-interlocking portion.

4. The method according to claim 2, wherein sides of the magnetic pole portions have depressions at positions corresponding to corners of the temporarily-interlocking portion.

5. The method according to claim 1, wherein the temporarily-interlocking portion has a side extending parallel to sides of the magnetic pole portions.

6. The method according to claim 2, wherein the temporarily-interlocking portion has a side extending parallel to sides of the magnetic pole portions.

7. The method according to claim 1, wherein sides of the magnetic pole portions each have a concave for engaging the temporarily-interlocking portion.

8. The method according to claim 2, wherein sides of the magnetic pole portions each have a concave for engaging the temporarily-interlocking portion.

9. The method according to claim 1, wherein spacing between the magnetic pole parts adjacent to each other becomes wider from the tip of the magnetic pole parts toward the yoke part.

10. The method according to claim 1, wherein sides of the magnetic pole parts adjacent to each other extend parallel to each other.

11. The method according to claim 7, wherein the temporarily-interlocking portion extends in a direction orthogonal to the magnetic pole portions, and the sides of the magnetic pole portions each have a groove for removing the temporarily-interlocking portion.

12. The method according to claim 1, wherein the temporarily-interlocking portion has an adjustment portion for adjusting tension between the magnetic pole portions.

13. The method according to claim 1, wherein the laminated core is a laminated core for a segmented stator.

14. The method according to claim 2, wherein the laminated core is a laminated core for a segmented stator.

15. A method for manufacturing a laminated core, the method comprising:
fastening a laminate manufactured by the method according to claim 1 by resin material, welding, or adhesive, and
removing the temporarily-interlocking part.

16. A method for manufacturing a laminated core, the method comprising:
fastening a laminate manufactured by the method according to claim 2 by resin material, welding, or adhesive; and
removing a temporarily-interlocking part that is formed by laminating the temporarily-interlocking portion in plurality.

17. The method for manufacturing a laminated core according to claim 15, wherein at the step of removing the temporarily-interlocking part, the temporarily-interlocking part between the magnetic pole parts is removed in a radial direction of the laminate.

18. The method for manufacturing laminated core according to claim 16, wherein at the step of removing the temporarily-interlocking part, the temporarily-interlocking part between the magnetic pole parts is removed in a radial direction of the laminate.

* * * * *